United States Patent
Feldmann-Krane et al.

(10) Patent No.: US 6,297,331 B1
(45) Date of Patent: Oct. 2, 2001

(54) ORGANOSILOXANYL DERIVATIVES OF ALKANEDIOL MONOVINYL ETHERS, PROCESS FOR THEIR PREPARATION, THEIR MODIFICATION AND THEIR USE AS PAINT ADDITIVES

(75) Inventors: Georg Feldmann-Krane, Mülheim; Wolfgang Josten, Essen; Rolf-Dieter Langenhagen, Hattingen; Gerhard Reusmann, Münster; Stefan Silber, Krefeld; Werner Spratte, Witten; Stefan Stadtmüller, Essen, all of (DE)

(73) Assignee: Th. Goldschmidt AG, Essen (DE)

(*) Notice: Subject to any disclaimer, the term of this patent is extended or adjusted under 35 U.S.C. 154(b) by 0 days.

(21) Appl. No.: 08/868,863

(22) Filed: Jun. 4, 1997

(30) Foreign Application Priority Data

Jun. 22, 1996 (DE) .............................. 196 25 075

(51) Int. Cl.[7] .................................. C08G 77/32
(52) U.S. Cl. .......................... 525/474; 525/475; 525/479; 528/26; 528/10; 528/28; 528/25; 528/29; 528/31; 528/33
(58) Field of Search .................. 528/10, 25, 29, 528/31, 33, 28, 26; 525/474, 475, 479

(56) References Cited

U.S. PATENT DOCUMENTS

| | | |
|---|---|---|
| 3,545,970 * | 12/1970 | Giorgianni et al. . |
| 4,083,856 * | 4/1978 | Mendicino . |
| 4,929,666 | 5/1990 | Schmidt et al. . |
| 5,006,624 | 4/1991 | Schmidt et al. . |
| 5,077,350 | 12/1991 | Mullins et al. . |
| 5,278,033 * | 1/1994 | Hagiwara et al. ............... 430/429 |
| 5,384,342 | 1/1995 | Szum . |
| 5,488,123 | 1/1996 | Engelhardt et al. . |
| 5,977,282 | 11/1999 | Ebbrecht et al. . |

FOREIGN PATENT DOCUMENTS 32153317   6/1983   (DE) .

OTHER PUBLICATIONS

Anonymous, "Photographic Processing Baths Containing Surfactants", Res. Disc., p 318–319, disclosure No. 22123, 1982.*

* cited by examiner

*Primary Examiner*—Jeffrey C. Mullis
(74) *Attorney, Agent, or Firm*—Frommer Lawrence & Haug LLP

(57) ABSTRACT

The invention relates to novel organosiloxanyl derivatives of the general formula:

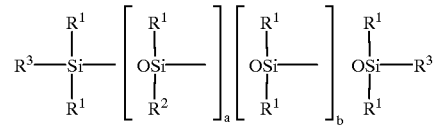

to a process for preparing these derivatives, to the use thereof for preparing organomodified siloxanes and to the use thereof as paint additives.

24 Claims, No Drawings

ORGANOSILOXANYL DERIVATIVES OF ALKANEDIOL MONOVINYL ETHERS, PROCESS FOR THEIR PREPARATION, THEIR MODIFICATION AND THEIR USE AS PAINT ADDITIVES

BACKGROUND OF THE INVENTION

The invention relates to novel organosiloxanyl derivatives of alkanediol monovinyl ethers, to a process for preparing these derivatives, to the use thereof for preparing organomodified siloxanes and to the use thereof as paint additives.

Hydroxyalkyl-functional polysiloxanes are commercially available (e.g. Tegopren HSi 2111, Th. Goldschmidt AG) and can easily be prepared industrially by known methods. Compounds of this kind are used, for example, as starting materials for the synthesis of silicone polyesters (U.S. Pat. No. 5,488,123). Likewise in accordance with the prior art are processes for preparing organopolysiloxanes which have on average at least one terminal or lateral group —(CH$_2$)$_3$OCH$_2$CH(X)CH$_2$OH, in which X can, for example, be a hydroxyl, alkoxy or amine group (DE-C-32 15 317).

In the course of these reactions of hydrogensiloxanes with 1-alkenyl alcohols, however, a side reaction which occurs is the unwanted rearrangement into the 2-alkenol, which is unreactive for hydrosilylations. Consequently, it is usually necessary in the case of such hydrosilylation reactions to employ a high excess of the alkenols, which is removed again by distillation after the end of the reaction. As is known, this problem is also encountered in the hydrosilylation reaction of hydridosiloxanes with allyl alcohol alkoxylates (U.S. Pat. No. 4,083,856). Here too, propenyl polyethers which are formed after rearrangement of the double bond withdraw almost completely from the hydrosilylation reaction and remain in the reaction mixture. As a result it is necessary first of all, in order to achieve complete conversion of the Si—H component, to start from an excess of the olefin component; in certain cases such excesses may be in the range of up to 50 mol percent. To prepare the pure hydrosilylation adducts it would also be necessary here to purify the reaction product by distillation to remove the rearrangement product. However, such purification, especially in the case of olefin components of relatively high molecular mass, is not technically feasible.

The use of 1,4-butanediol monovinyl ether as an adduct with silanes has already been mentioned in U.S. Pat. No. 5,384,342. In that document, however, the linkage is formed by way of a silicon-oxygen bond, so that the free double bond remains available for UV-induced crosslinking reactions. In this way, however, no hydroxyalkyl-functional silane derivatives are formed.

SUMMARY OF THE INVENTION

The present invention, then, provides organosiloxanyl derivatives with ethyl hydroxyalkyl ether attached via carbon to silicon and their preparation and provides for their use as paint raw materials and for their use as intermediates for the preparation of silicone polyethers, silicone polyesters, silicone polyurethanes, silicone acrylates and silicone isocyanates.

The compounds of the present invention, then, are of the general formula:

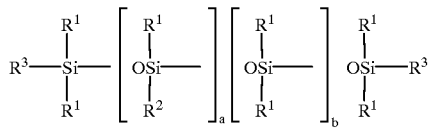

in which
R$^1$=identical or different aliphatic or aromatic hydrocarbon groups,
R$^2$=CH$_2$CH$_2$O(CR$^4$R$^5$)$_x$OH, where
R$^3$=R$^2$ or R$^1$,
a=1 to 50 and
b=0 to 500.

It is familiar to the expert that the compounds exist in form of a mixture of oligomers having a distribution which is governed essentially by statistical laws. The values of a and b are, consequently, mean values.

Compounds of this kind are in turn, for example, useful raw materials for further-prior art-reactions to give follow-on products. Among such reactions, primary mention should be made of reactions giving silicone polyethers, silicone polyesters, silicone polyurethanes, silicone acrylates or silicone isocyanates.

The novel organosiloxanyl derivatives are readily obtainable by way of transition metal catalyzed hydrosilylation reactions of organosiloxanyl derivatives with alkanediol monovinyl ethers.

They can be prepared in a simple manner such as, for example, by subjecting hydrogen-functional siloxanes of the general formula:

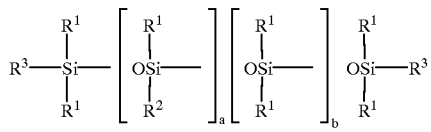

in which
R$^1$=identical or different aliphatic or aromatic hydrocarbon groups,
R$^2$=H
R$^3$=R$^2$ or R$^1$,
a=1 to 50 and
b=0 to 500;
to an addition reaction with alkanediol monovinyl ethers of the general formula:

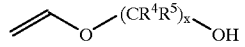

in which
R$^4$ and R$^5$ can be identical or different groups and are each a H or an alkyl group, branched or unbranched, having up to a total of 12 carbon atoms, and x has a value from 2 to 11, in the presence of a conventional hydrosilylation catalyst (platinum or rhodium catalyst).

Preferred examples of the groups R$^4$ and R$^5$ are hydrogen and alkyl groups from C1 to C8. More preferably, R$^4$ and R$^5$ are hydrogen. Preferably, x is the value of from 2 to 6. More preferably, x=4.

In the course of the hydrosilylation reaction with alkanediol monovinyl ethers it has been found, surprisingly, that no excess of the olefinic component is necessary in such reactions but that this component can be employed in an amount equimolar with the SiH component, since the rearrangement of the double bond (for example in the case of allyl groups) which otherwise occurs with hydrosilylation reactions is ruled out in the case of the vinyl double bond in the examples described.

Examples of novel substances of the present invention are:

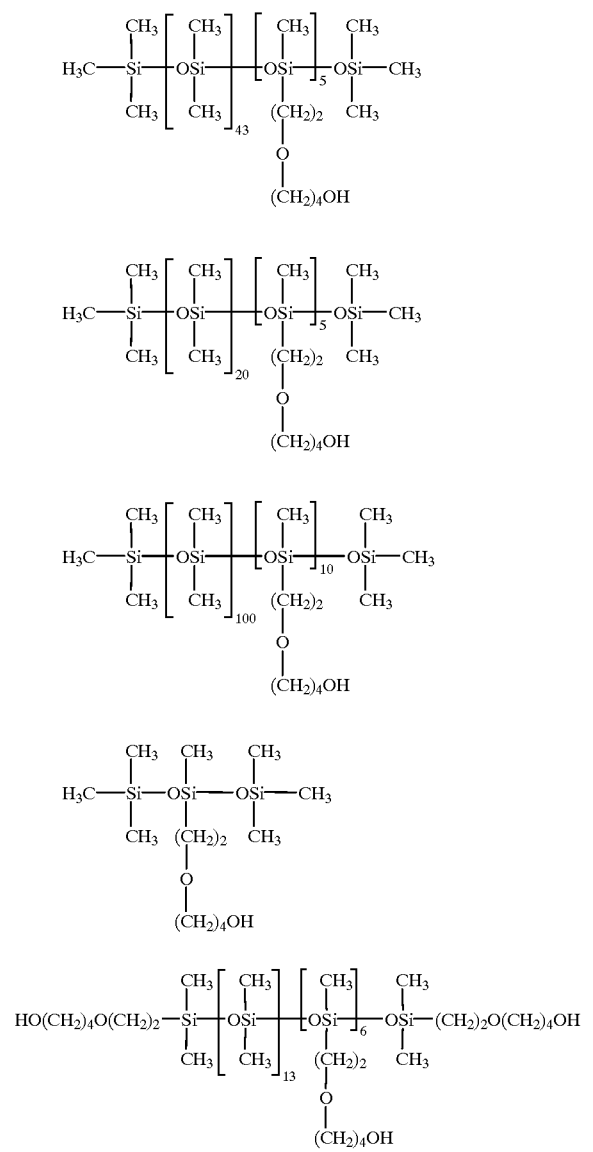

The siloxanes employed for the reactions with vinyl hydroxyalkyl ether can, for example, have the following structure:

| Compound | a | b | R |
|---|---|---|---|
| 1 | 1 | 0 | Me |
| 2 | 5 | 13 | Me |
| 3 | 5 | 43 | Me |
| 4 | 4.5 | 20.5 | Me |
| 5 | 25 | 75 | Me |
| 6 | 10 | 80 | H |
| 7 | 10 | 100 | Me |

The novel organosiloxanyl derivatives, in turn, are valuable starting compounds for further, prior art reactions to give follow-on products. Among such reactions primary mention should be made of reactions giving silicone polyethers, silicone polyesters, silicone polyurethanes, silicone acrylates or silicone isocyanates.

Examples of such organomodified organosiloxanes are

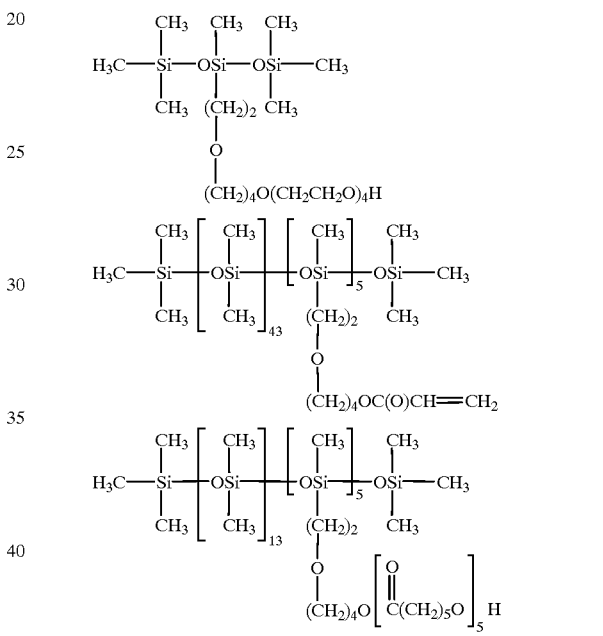

The novel compounds and their derivatives can be used, for example, as additives in waterborne, solventborne or powderborne paints or printing inks, and can also be used as deaerating agents, lubricants and leveling agents, etc. Typical concentrations employed are between 0.01 and 15% by weight.

Surprisingly, the use of the novel compounds is particularly suitable for the production of dirt-repellent coatings. They can be used, for example, for producing anti-graffiti coatings.

The problem of graffiti has in recent years confronted the public again and again. In most cases it is public buildings and public transportation vehicles that are affected. Since in the majority of cases removal is not possible by simply washing, costly, labor intensive repainting of the surfaces carrying the graffiti is usually necessary.

Protective coatings comprising fluorine-containing polymers, as described, for example, in U.S. Pat. No. 4,929,666 and U.S. Pat. No. 5,006,624, bring about the dirt-repelling properties through a reduction in the surface tension.

Polysiloxane compounds likewise bring about a reduction in surface tension. For instance, the solution polymers described in DE-A-26 10 372, which are prepared in a mixture of organic solvents and alkylhydrogenpolysiloxanes, are used to impregnate textiles.

Copolymerization of (meth)acrylic monomers with epoxy functions in the presence of silanols produces, in accordance with U.S. Pat. No. 5,077,350, a polymer for powder coatings. Owing to the high reactivity of the silanols employed, which comprise at least two Si—OH functions, copolymerization without the occurrence of gelling is possible only with specific monomers.

EP-A-0 603 561 describes polydimethylsiloxane-containing binders which are obtained by free-radical polymerization of (meth)acrylate monomers in the presence of α,ω-functional polysiloxanes. Because of the low functionality of the polysiloxanes, it is possible for there to be instances of incompatibility with paint systems, and the systems exhibit inadequate resistance to soiling, as, for example, to felt-tipped pens.

DE-A-35 35 283 describes polyester-functional polysiloxanes for paints and molding compounds. The polysiloxane gives an anti-adhesive character to the paints or molding compounds. Because of the relatively poor effectiveness of the polysiloxanes it is necessary to use a very high concentration, with the result that other paint properties are adversely affected.

A further object of the invention, therefore, is to provide coating components which are suitable for dirt-repelling coatings and which retain their dirt-repelling action over a long period of, for example, several years.

It has been found that this object can be achieved by coating compositions which comprise as a constituent of the coating material, in concentrations of from 0.01 to 15%, preferably from 1 to 10%, organosiloxane derivatives modified with alkanediol monovinyl ether.

The invention therefore also provides modified polysiloxanes which are suitable for coating compositions.

The novel compounds of the present invention can be incorporated simply by stirring into the coating compositions which are to have a dirt-repelling action. These coating compositions can be paint systems which are customary in the paints sector. Surprisingly, the novel compounds are suitable for both solventborne and waterborne paint systems. The liquid phase can also be in the form of monomers or low molecular mass compounds which react with other binder components to form the coatings. The paints according to the invention can also be socalled powder coatings, which thus contain no liquid phase and are applied in the form of powders to the substrates that are to be coated, where they are brought to reaction.

For the preparation of the coating compositions it is possible to add customary additives as are common, for example, in the paints sector. Examples of such additives are pigments, for example hiding, color-imparting pigments, such as titanium dioxides or carbon black and special-effect pigments, such as metal flake pigments and/or pearl luster pigments, or transparent pigments.

Other examples of additives are fillers, for example talc and silicates, plasticizers, stabilizers, including light stabilizers, and leveling agents, such as silicone oils.

The desired application viscosity of the coating compositions produced using the novel compounds can be established by appropriately regulating the addition of solvents and/or water and/or additives.

The curing of coatings produced from the coating compositions is dependent on the particular nature of the crosslinking reaction and can be effected within a wide temperature range of, for example, from −10° C. to 200° C.

Surprisingly, even when curing takes place at room temperature, the novel compounds exhibit a good anti-graffiti effect.

The coating compositions produced from the novel compounds are suitable for coatings which adhere to a large number of substrates, for example wood, plastic, glass, ceramic, textiles, plaster, cement and, in particular, metal. The coating compositions can also be employed in multicoat techniques. They can be applied, for example, to customary primers, basecoats, fillers or existing topcoats.

The novel compounds are particularly suitable for coating compositions which are to have a dirt-repelling action. The present invention therefore also provides for the use of the novel compounds in topcoats or clearcoats.

With the novel compounds, a high dirt-repelling action is obtained, for example an anti-graffiti action, which is maintained over long periods even under adverse weather conditions. Even after the surface of the coating material has been cleaned a number of times, for example by solvents, commercial graffiti removers or scraping, the dirt-repelling action is maintained.

The novel coating composition can be applied in a customary manner, for example by dipping, spraying, brushing electrostatically.

The examples which follow serve to illustrate the invention.

EXAMPLE 1

Addition of 1,4-butanediol Monovinyl Ether Onto a Siloxane with Lateral Si—H Functions In a three-necked flask fitted with an intensive condenser, thermometer and dropping funnel and with a nitrogen port, 116.16 g of 1,4-butanediol monovinyl ether are heated to 100° C., and at this temperature 10 ppm of platinum catalyst and 0.05% by weight of n-butylethanolamine are added. At this temperature, 282.0 g of siloxane 2 with lateral Si—H functions are added dropwise over the course of 20 minutes at a rate such that the reaction temperature does not exceed 110° C. After 3 hours the conversion is greater than 99.5%. After cooling to room temperature the product is filtered.

According to the results of $^{29}$Si-NMR and $^{13}$C-NMR spectroscopy, the end product has the following structure:

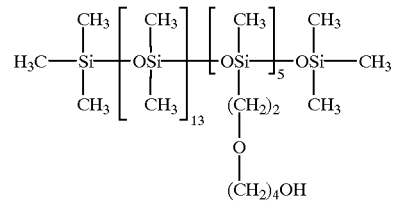

EXAMPLE 2

Addition of 1,4-butanediol monovinyl ether onto a siloxane with lateral Si—H Functions 116.16 g of 1,4-butanediol monovinyl ether are heated to 100° C. Following the addition of 10 ppm platinum catalyst and 0.05% by weight of n-butylethanolamine, a total of 219.0 g of siloxane 1 with lateral Si—H functions are added dropwise. The period of dropwise addition is 2 hours. After stirring at 100° C. for 5 hours the conversion is greater than 99.5%. After cooling to room temperature the product is filtered.

According to the results of $^{29}$Si-NMR and $^{3}$C-NMR spectroscopy, the end product has the following structure:

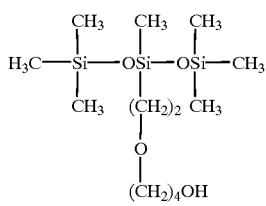

EXAMPLE 3

Addition of 1,4-butanediol monovinyl ether onto a siloxane with lateral Si—H functions 90.6 g of 1,4-butanediol monovinyl ether are heated to 100° C. Following the addition of 10 ppm platinum catalyst and 0.05% by weight of n-butylethanolamine, a total of 638.0 g of siloxane 7 with lateral Si—H functions are added dropwise. The period of dropwise addition is 2 hours. After stirring at 100° C. for 6.5 hours the conversion is greater than 99.5%. After cooling to room temperature the product is filtered.

According to results of $^{29}$Si-NMR and $^{13}$C-NMR spectroscopy, the end product has the following structure:

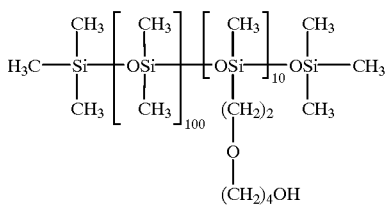

EXAMPLE 4

Ethoxylation of a hydroxyalkylsiloxane 169 g of lateral hydroxyalkylsiloxane, as synthesized in Example 2, together with 2.5 mol-% of sodium methylate and 2.5 mol-% of potassium methylate are charged under nitrogen to a reaction vessel with stirrer, dropping funnel and thermometer and are heated to 110° C. At this temperature a total of 92.2 g of ethylene oxide are added dropwise. The mixture is subsequently held at temperature for 2 hours more. Aqueous sodium hydrogen phosphate solution is added to neutralize the crude product, and the mixture is then filtered.

According to results of $^{29}$Si-NMR and $^{13}$C-NMR spectroscopy, the end product has the following structure:

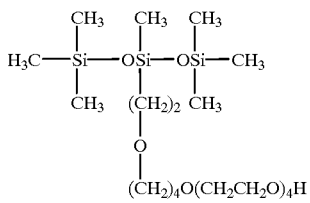

EXAMPLE 5

Reaction of Hydroxyalkylsiloxane with an Isocyanate

Under a nitrogen blanket in a reaction vessel with stirrer and thermometer, 66.7 g of isophorone diisocyanate, 256.5 g of lateral hydroxyalkylsiloxane (adduct of 1,4-butanediol monovinyl ether with siloxane 3 having lateral Si—H functions) and 1.6 g of a 5% strength solution of dibutyltin laurate in xylene are combined and the mixture is heated to 25° C. It is reacted at this temperature for 2 h. According to the results of $^{29}$Si-NMR and $^{13}$C-NMR spectrocopy the product thus obtained has the following structure:

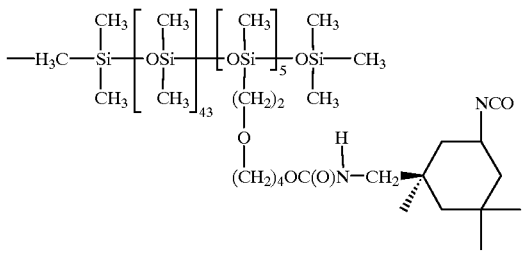

EXAMPLE 6

Acrylicization of a Hydroxyalkylsiloxane

In a reaction vessel with stirrer, dropping funnel and thermometer, 0.17 eq of lateral hydroxyalkylsiloxane having an OH number of 64 is heated to 65° C. together with 180 ml of cyclohexane and 100 ppm methylhydroquinone under nitrogen. At this temperature, 0.3% of trifluoromethanesulfonic acid is added and then a total of 0.17 eq of acrylic acid is added dropwise. The water of condensation is separated off by means of a water separator. The reaction period is about 3 hours. The reaction mixture is then neutralized with 2% strength sodium carbonate solution and is filtered, and the filtrate is distilled (80° C.; 10 torr).

According to the results of $^{29}$Si-NMR and $^{3}$C-NMR spectroscopy, the end product has the following structure:

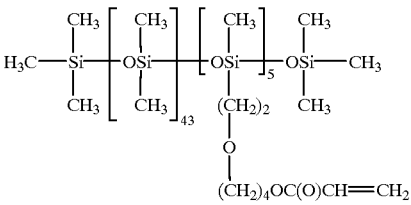

EXAMPLE 7

Reaction of a Hydroxyalkylsiloxane with ε-caprolactone

In a three-necked flask with mounted reflux condenser and KPG stirrer, 65.0 g of hydroxyalkylsiloxane (as described in Example 1) are heated to 90° C. together with 16.5 g of ε-caprolactone and 0.12 g of tin dioctoate. The reaction mixture is reacted at this temperature for a total of 7 hours. The product is freed from excess caprolactone by distillation at 120° C.

According to the results of $^{29}$Si -NMR and $^{13}$C-NMR spectroscopy, the end product has the following structure:

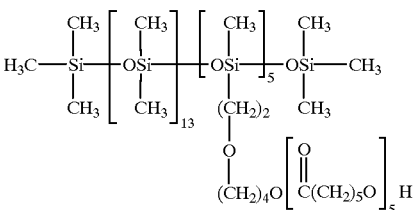

Preparation of Paints

All parts (p) are by weight.

Paint Example Ia 50 p of Macrynal VSM 1565 (70%)
1 p of methoxypropyl acetate
1.5 p of Solvesso 100
5 p of butyl acetate
0.6 p of dibutyltin dilaurate (1% in xylene)
36 p of Kronos RW 59
1 p of compound from Example 3
4 p of butyl acetate
1 p of commercial isocyanate hardener are mixed homogeneously with one another in succession. The mixture is then applied with a dry film thickness of from 30 to 100 μm to a commercial primer. The paint is cured at room temperature for 7 days. As an alternative, it can be cured at 60° C. for 16 hours.

Comparison Experiment A

The procedure of Example Ia is repeated, with the novel compound from Preparation Example 3 being replaced by the α,ω-hydroxylakyl-functional polydimethylsiloxane Tegopren H—Si 2111 (Th. Goldschmidt AG).

Comparison Experiment B the procedure of Example Ia is repeated, with the novel compound from Preparation Example 3 being replaced by the silicone caprolactone Byk 370 (BYK).

the following investigations are carried out:

Delamination:
A Bonder panel is sprayed, after the paint has cured, with commercial canned spray paints. After this paint film has dried, this area is covered with adhesive tape. The layer of spray paint is removed by tearing off the tape.

1=very good spray paint adhesion
2=good spray paint adhesion
3=no spray paint adhesion Felt-tipped Pen Resistance:
After the paint has cured, the object is written on using a commercial felt-tipped pen. After drying, a dry paper handkerchief is used to remove the felt-tipped pen by rubbing.

1=impossible to remove the felt-tipped pen
2=difficult to remove the felt-tipped pen
3=easy to remove the felt-tipped pen Chemical Resistance:
The chemical tests are carried out with the solvents xylene, ethylglycol and methoxypropyl acetate in accordance with DIN 53 168.

After 100 Weatherometer:
The delamination test and the felt-tipped pen resistance are tested after 100 hours of Weatherometer (WOM) sunshine testing.

| Paint Example | Felt-tipped pen resistance | | Delamination | | Chemical resistance |
|---|---|---|---|---|---|
| | 48 h RT | after 100 h WOM | 48 h RT | after 100 h WOM | |
| After 2 days of drying room temperature: | | | | | |
| Ia | 3 | 3 | 3 | 3 | Satisfactory |
| Comparison Experiment A | 1 | 1 | 1 | 1 | Satisfactory |
| Comparison Experiment B | 1 | 1 | 1 | 1 | Satisfactory |
| After 7 days of drying room temperature: | | | | | |
| Ia | 3+ | 3+ | 3+ | 3+ | Satisfactory |
| Comparison Experiment A | 2 | 2 | 2 | 2 | Satisfactory |
| Comparison Experiment B | 1 | 1 | 1 | 1 | Satisfactory |

Paint Example Ib 50 p of Macrynal VSM 1565 (70%)
1 p of methoxypropyl acetate
1.5 p of Solvesso 100
5 p of butyl acetate
0.6 p of dibutyltin dilaurate (1% in xylene)
1 p of compound from Example 3
4 p of butyl acetate
1 p of commercial isocyanate hardener are processed analogously to Paint Example Ia.

Paint Example Ic

| | |
|---|---|
| 50 | p of Bayhydrol VPLS 2139 |
| 1 | p of Surfynol 104 E (50%) |
| 5.5 | p of Acrysol RM8 (18% in ethanol) |
| 24 | p of Bayertitan RKB-4 |
| | pH 7.5 with DMEA |
| 35 | p of deionized water | are mixed homogeneously with one another in a bead mill and the mixture is adjusted with deionized water to a flow time of 85 seconds from the DIN 4 cup. The formulation is then applied with a dry film thickness of from 30 to 100 μm to a commercial primer. The paint is cured at room temperature for 7 days. Alternatively, it can be cured at 60° C. for 16 hours.

The above Examples give good evidence of the superiority of the novel compounds in the context of obtaining a permanent anti-graffiti effect.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A process for preparing an organopolysiloxane of the formula

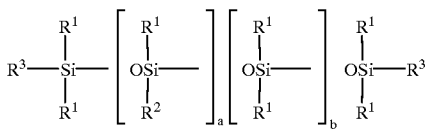

in which
  $R^1$=identical or different aliphatic or aromatic hydrocarbon groups,
  $R^2=CH_2CH_2O(CR^4R^5)_xOH$ where
  $R^4$ and $R^5$ are identical or different groups and are H or a branched or unbranched $C_1$–$C_{12}$-alkyl group, and x has a value from 2 to 11,
  $R^3=R^2$ or $R^1$,
  a=1 to 50, and
  b=0 to 500;
which comprises subjecting hydrogen functional siloxane of the formula

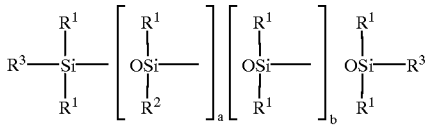

where
  $R^1$=identical or different aliphatic or aromatic hydrocarbon groups,
  $R^2$=H,
  $R^3=R^2$ or $R^1$,
  a=1 to 50, and
  b=0 to 500;
to an addition reaction with alkanediol monovinyl ether of the formula

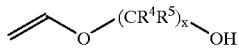

where
  $R^4$ and $R^5$ are identical or different and are hydrogen or a branched or unbranched $C_1$–$C_{12}$-alkyl group, and
  x has a value of 2 to 11;
in the presence of a hydrosilylation catalyst.

2. The process according to claim 1, wherein the catalyst is platinum catalyst or a rhodium catalyst.

3. The process according to claim 1, wherein
  $R^4$ and $R^5$ are hydrogen, and
  x is 4.

4. A process for preparing a silicone polyether which comprises:
  1. subjecting a organopolysiloxane of the formula

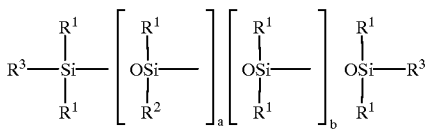

where
  $R^1$=identical or different aliphatic or aromatic hydrocarbon groups,
  $R^2$=H,
  $R^3=R^2$ or $R^1$,
  a=1 to 50, and
  b=0 to 500;
  to an addition reaction with alkanediol monovinyl ether of the formula

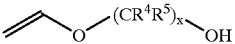

where
  $R^4$ and $R^5$ are identical or different and are hydrogen or a branched or unbranched $C_1$–$C_{12}$-alkyl group, and
  x has a value of 2 to 11 in the presence of a hydrosilation catalyst; and
  2. reacting the organopolysiloxane formed in step 1 with an epoxide.

5. The process according to claim 4, wherein the epoxide is ethylene oxide.

6. A process for preparing a silicone polyester which comprises:
  1. subjecting an organopolysiloxane of the formula

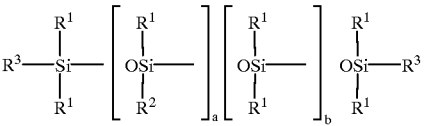

where
  $R^1$=identical or different aliphatic or aromatic hydrocarbon groups,
  $R^2$=H,
  $R^3=R^2$ or $R^1$,
  a=1 to 50, and
  b=0 to 500;
  to an addition reaction with alkanediol monovinyl ethers of the formula

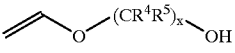

where
  $R^4$ and $R^5$ are identical or different and are hydrogen or a branched or unbranched $C_1$–$C_{12}$-alkyl group, and
  x has a value of 2 to 11;
  in the presence of a hydrosilation catalyst; and
  2. esterifying the organopolysiloxane formed in step 1 with an ester.

7. The process according to claim 6, wherein the ester is ε-caprolactone.

8. A process for preparing a silicone polyurethane which comprises:
  1. subjecting an organopolysiloxane of the formula

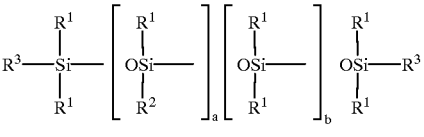

where

R$^1$=identical or different aliphatic or aromatic hydrocarbon groups,
R$^2$=H,
R$^3$=R$^2$ or R$^1$,
a=1 to 50, and
b=0 to 500;
to an addition reaction with alkanediol monovinyl ethers of the formula

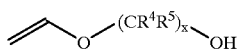

where
R$^4$ and R$^5$ are identical or different and are hydrogen or a branched or unbranched C$_1$–C$_{12}$-alkyl group, and
x has a value of 2 to 11;
in the presence of a hydrosilation catalyst; and
2. reacting the hydroxyalkylsilane formed in step 1 with a isocyanate.

9. A process for preparing a silicone isocyanate which comprises
1. subjecting an organopolysiloxane of the formula

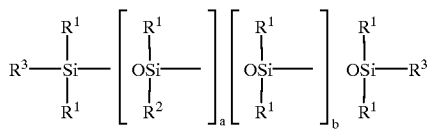

where
R$^1$=identical or different aliphatic or aromatic hydrocarbon groups,
R$^2$=H,
R$^3$=R$^2$ or R$^1$,
a=1 to 50, and
b=0 to 500;
to an addition reaction with alkanediol monovinyl ether of the formula

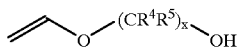

where
R$^4$ and R$^5$ are identical or different and are hydrogen or a branched or unbranched C$_1$–C$_{12}$-alkyl group, and
x has a value of 2 to 11;
in the presence of a hydrosilation catalyst; and
2. reacting the organopolysiloxane formed in step 1 with an isocyanate.

10. The process according to claim 9 wherein the isocyanate is isophorone diisocyanate.

11. A curable, dirt-repelling coating composition which comprises an organopolysiloxane of the formula

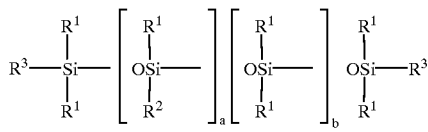

where
R$^1$=identical or different aliphatic or aromatic hydrocarbon groups,
R$^2$CH$_2$CH$_2$OC(CR$^4$R$^5$)$_x$OH, where
R$^4$ and R$^5$ are identical or different groups and are hydrogen or a branched or unbranched C$_1$–C$_{12}$-alkyl group and
x has a value of 2 to 11,
R$^3$=R$^2$ or R$^1$,
a=1 to 50, and
b=0 to 500
and, optionally, a solvent and/or pigment.

12. The curable, dirt repelling coating composition according to claim 11, wherein the organopolysiloxane comprises from 0.01 to 15% of the composition.

13. The curable, dirt repelling coating composition according to claim 12 wherein,
a=5 to 20;
b=6 to 500; and
x=3 to 6.

14. The curable, dirt-repelling coating composition according to claim 12, wherein R$^4$ and R$^5$ are hydrogen.

15. The curable, dirt-repelling coating composition according to claim 12, wherein R$^1$ is a methyl group.

16. The curable, dirt-repelling composition according to claim 12 wherein b is 50 to 150 and x is 4.

17. The curable, dirt-repelling composition according to claim 11 wherein the coating composition is an aqueous composition.

18. The curable, dirt-repelling composition according to claim 11 wherein the composition is a powder composition.

19. A method of preventing dirt or ink from collecting on a surface of substrate which comprises applying the curable, dirt-repelling composition according to claim 11 to said surface.

20. The method according to claim 19 wherein the substrate is wood, plastic, glass, ceramic, textiles, plaster, cement or metal.

21. An ink or a paint composition which comprises an organopolysiloxane of the formula

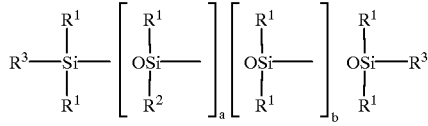

where
R$^1$=identical or different aliphatic or aromatic hydrocarbon groups,
R$^2$CH$_2$CH$_2$OC(CR$^4$R$^5$)$_x$OH, where
R$^4$ and R$^5$ are identical or different groups and are hydrogen or a branched or unbranched C$_1$–C$_{12}$-alkyl group and X has a value from 2 to 11,
R$^3$=R$^2$ or R$^1$,
a=1 to 50, and
b=0 to 500,
a pigment and, optionally, a solvent.

22. The ink or paint according to claim 21 wherein
a=5 to 20;
b=6 to 500;
x=3 to 6.

23. The ink or paint composition according to claim 22 wherein
b=50 to 150
x=4.

24. The ink or paint composition according to claim 23, wherein
R$^1$ is a methyl group and
R$^4$ and R$^5$ are hydrogen.

* * * * *